Nov. 7, 1961 R. B. HEEGER 3,007,470
WATER HEATING SYSTEM
Filed March 26, 1959
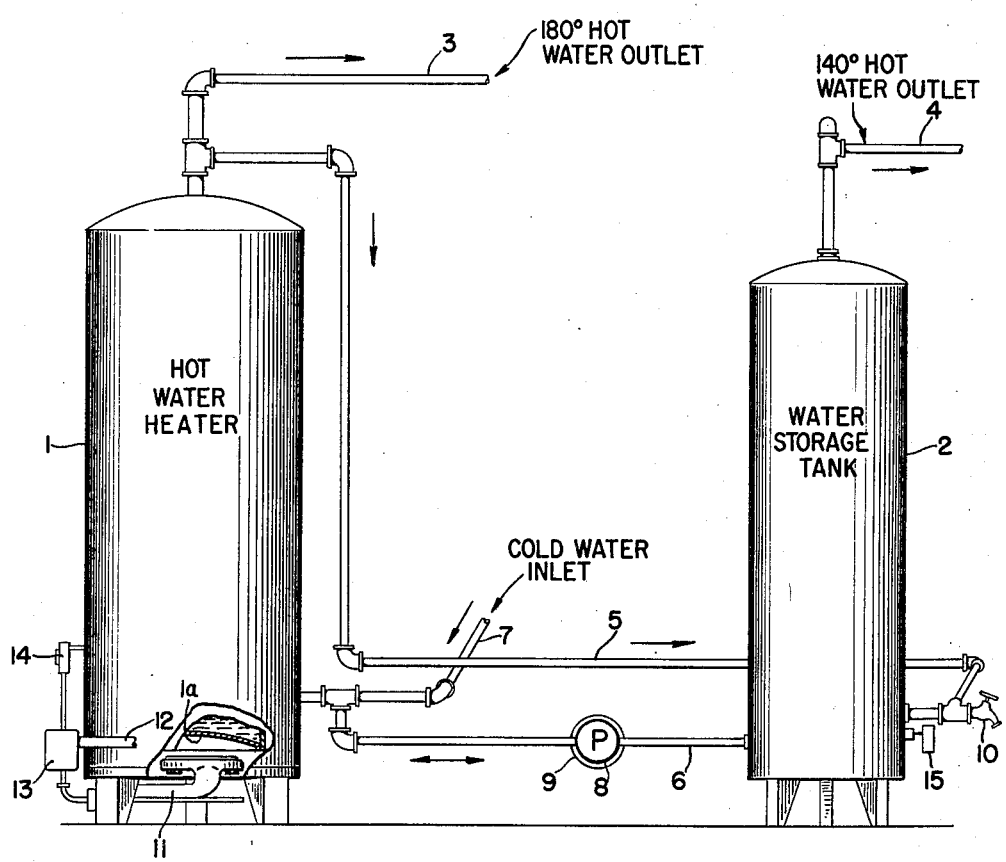
FIG. I
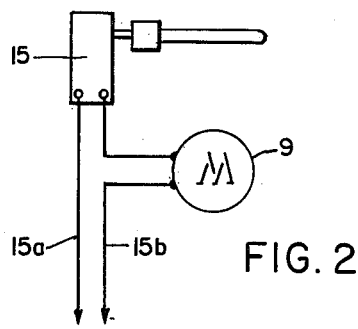
FIG. 2
*INVENTOR.*
ROBERT B. HEEGER
BY *Andrus & Starke*
Attorneys

United States Patent Office 3,007,470
Patented Nov. 7, 1961

3,007,470
WATER HEATING SYSTEM
Robert B. Heeger, Kankakee, Ill., assignor to A. O. Smith Corporation, Milwaukee, Wis., a corporation of New York
Filed Mar. 26, 1959, Ser. No. 802,216
7 Claims. (Cl. 126—362)

This invention relates to a water heating system and more particularly to a system which can be used to supply water at two different temperatures.

For large commercial installations, water heating systems, such as those described in United States Patents Nos. 2,591,400, 2,291,023 and 2,852,018, assigned to a common assignee with the present application, are frequently used to supply general washing water at a temperature of about 140° F. and sanitizing water at a temperature of about 180° F. In the systems disclosed in the above patents, an instantaneous type water heater is used in combination with a storage tank, and water, at a temperature of approximately 140° F., is maintained in the storage tank by passing water from the tank through the heater and returning the heated water to the storage tank. Water discharged from the heater and returning to the storage tank is at the sanitizing temperature and this water is drawn from the hot water line to the sanitizing apparatus which may be a dishwashing machine or the like. With a system of this kind, there is no storage of the 180° F. sanitizing water, yet the 180° water is readily available for rinsing and sanitizing operations.

For smaller commercial and industrial applications in which there is a lesser demand for both 140° F. and 180° F. water, a storage-type water heater is often employed in combination with a mixing valve which can temper the 180° F. water with cold water to supply a lower temperature washing water at 140° F.

The present invention is directed to a water heating system for use in a small commercial or industrial installation which stores and supplies heated water at two different temperatures. More specifically, the water heating system includes a storage-type hot water heater adapted to supply and store water at a sanitizing temperature of 180° F. and a hot water storage tank which is adapted to store and supply lower temperature heated water of approximately 140° F.

A hot water line connects the upper portion of the water heater with the bottom portion of the storage tank and serves to conduct 180° F. water from the water heater to the storage tank. A return line connects the bottom of the storage tank with the bottom of the water heater to provide a closed system and cold water is introduced into the return line. The water is circulated within the closed system by a pump which is disposed within the second line.

The water is heated in the water heater by a conventional gas burner assembly and the operation of the gas burner and the pump are controlled by two thermostats. One thermostat is located in the water heater and is operably connected to the gas burner. This thermostat is responsive to a temperature of about 180° F. in the water heater and when the temperature of the water within the water heater falls beneath this temperature, the thermostat actuates the burner to supply heat to the water therein.

A second thermostat is located in the storage tank and is responsive to a temperature of approximately 140° F. This thermostat is operably connected to the pump and when the temperature in the storage tank falls below 140° F., the pump operates to circulate water from the hot water heater to the storage tank to raise the temperature of the water therein.

When sanitizing water at 180° F. is drawn from the system for sanitizing purposes, cold water is introduced into the return line and flows to the hot water heater. The entry of the cold water into the hot water heater actuates the thermostat therein to operate the gas burner until the temperature of the water in the hot water heater is raised to 180° F.

When 140° F. water is drawn from the storage tank for general washing operations, cold water flows into the return line and flows through the pump to the storage tank. The thermostat associated with the storage tank will then actuate the pump to pump water from the hot water heater to the storage tank to raise the temperature therein. When the 140° F. temperature in the storage tank is regained, the thermostat turns off the pump.

The present invention provides an inexpensive apparatus for supplying water at two different temperatures for a small commercial or industrial establishment. The system provides a substantial storage capacity of both 180° F. water for sanitizing purposes and 140° F. water for washing purposes.

As the hot water being stored is not all at a high temperature of 180° F., the standby loss will be reduced. In addition, only one heater is required to provide a substantial storage capacity of both 180° F. water and 140° F. water.

Other objects and advantages will appear in the course of the following description.

In the drawings:

FIG. 1 is a schematic representation of the water heating system of the present invention; and FIG. 2 is a wiring diagram showing the electrical connection between the pump motor and the thermostat.

FIG. 1 illustrates a water heating system designed to supply water at two different temperatures. One supply of water, at about 140° F., is used for general washing operations, and the higher temperature water, at about 180° F., is adapted for use for sanitizing or rinsing purposes.

The water heating system comprises a storage type hot water heater 1 which is adapted to heat and store water at the sanitizing temperature, and a water storage tank 2 which is adapted to store water at the washing temperature of about 140° F. Heated water, at the sanitizing temperature of about 180° F., is withdrawn from the upper portion of water heater 1 through a conduit 3 and general washing water, at a temperature of about 140° F., is withdrawn from the upper portion of the storage tank 2 through conduit 4.

A hot water conduit 5 connects the conduit 3 with the lower portion of the storage tank 2 and serves to conduct heated water at the sanitizing temperature from the hot water heater 1, to the storage tank 2. In addition, a return conduit 6 is connected between the lower portion of the storage tank 2 and the lower portion of the water heater 1 and serves to return water from the storage tank to the water heater.

Cold water is introduced into the system through a conduit 7 which is connected to the return conduit 6.

The water heater 1, storage tank 2 and conduits 5 and 6 comprise a closed system and water is circulated within this closed system by a pump 8 which is located in the conduit 6. The pump 8 is driven by a suitable motor 9.

Water is drained from this system by a drain valve 10 which is located in the conduit 5 adjacent the tank 2.

To heat the water in the tank 1a of the water heater 1, a gas burner 11 is disposed beneath the tank 1a. Gas is supplied to the burner 11 through a gas line 12 and the flow of gas within the line 12 is controlled by a thermostatically operated gas valve 13. While the description shows the water heating means as a gas burner, it is contemplated that an electric heating element or other heating means can also be used to heat the water within the water heater 1.

The circulation of water within the system and the operation of the burner 11 is controlled by thermostatic elements which are associated with the water heater 1 and storage tank 2. A thermostat 14 is disposed in the lower portion of water heater 1 and is responsive to the temperature of the water in the water heater. The thermostat 14 is set at a temperature of about 180° F. and is connected in series with the solenoid valve 13. When the temperature of the water within the water heater 1 falls beneath the temperature setting of approximately 180° F., the thermostat operates to open the solenoid valve 13 and permits gas to flow to the burner 11 to thereby heat the water in the water heater. When the temperature of the water in the heater has regained the temperature setting of approximately 180° F., the thermostat 14 operates to close the solenoid valve 13 and cut off the flow of gas to the burner.

In addition to thermostat 14, a second thermostat 15 is disposed in the lower portion of the storage tank 2 and is responsive to the temperature of the water in the storage tank. The thermostat 15 is set at a temperature substantially lower than the setting of thermostat 14 and generally in the neighborhood of about 140° F. The thermostat 15 is connected electrically in series with the pump motor 9 and serves to actuate the pump when the temperature of the water within the storage tank falls below 140° F. As shown in FIG. 2, lines 15a and 15b are connected to a suitable source of electrical energy, and line 15a is connected to one terminal of the thermostat 15 while line 15b is connected through the motor 9 to the other terminal of the thermostat 15. When the temperature of the water in the storage tank has regained the 140° F. temperature, the thermostat 15 serves to de-energize the motor and shut off the pump.

When starting with a cold system in which the water in the water heater 1 and storage tank 2 is below the temperature setting of the respective thermostats, thermostat 14 will actuate the gas valve 13 to admit gas to the burner to heat water within the water heater and thermosat 15 will actuate the pump 8 to circulate water in the system. Water is therefore circulated through line 5 from the water heater to the storage tank and back through line 6 to the water heater. When the temperature of the water in the storage tank reaches the setting of thermostat 15, the thermostat will act to de-energize the pump motor 9 and stop the pump. The gas burner 11 will still operate, however, until the temperature of the water in the water heater 1 reaches the temperature setting of thermostat 14 and when this occurs, the thermostat 14 will act to close solenoid valve 13 and cut off the heat to the water.

When drawing 180° F. water for sanitizing purposes from the line 3, cold water is drawn into the system through conduit 7 and flows to the lower portion of the water heater 1. The entry of the cold water to the water heater will decrease the temperature of the water in the heater to a value below the temperature setting of thermostat 14. Thus, thermostat 14 will open the gas valve 13 to admit gas to the burner. When the temperature of the water in the heater 1 has regained the 180° F. level, the thermostat 14 will then close solenoid valve 13 to cut off the flow of gas to the burner 11. When sanitizing water is drawn through conduit 3, there is no flow of water through line 5 to the storage tank, for water is merely drawn in through the cold water inlet conduit 7 and hot water is drawn off through conduit 3.

When drawing 140° F. water for general washing purposes through conduit 4, cold water is drawn into the system through conduit 7 and passes through conduit 6 and pump 8 to the lower portion of the storage tank 2. The entry of cold water into the storage tank 2 will decrease the temperature of the water in the tank below the temperature setting of thermostat 15 so that the thermostat 15 will then actuate the pump motor 9 to operate the pump. As the pump is operated, the cold water entering through conduit 7 then is forced into the water heater 1 and the entry of the cold water into the water heater will then reduce the temperature of the water in the water heater below the temperature setting of thermostat 14. Thermostat 14 will then open valve 13 to admit gas to the burner and heat the water within the water heater.

As the pump is operating, hot water from the water heater 1 will pass through hot water conduit 5 to the storage tank 2. When the temperature of the water in the storage tank reaches 140° F., the thermostat 15 will stop operation of the pump. The burner 11 will continue to heat the water in the water heater until the temperature of the water reaches the setting of thermostat 14.

The present invention provides an inexpensive system for providing two temperatures of heated water in which a substantial capacity of both sanitizing water and general purpose hot water is separately stored.

The system incorporates a single storage-type water heater of the conventional domestic type and enables both 140° F. and 180° F. water to be stored with the use of this single water heater. The system reduces the standby loss over a water heating system in which all of the water is stored at the sanitizing temperature of 180° F.

Various modes of carrying out the invention are contemplated as being within the scope of the following claims particularly pointing out and distinctly claiming the subject matter which is regarded as the invention.

I claim:

1. A water heating system adapted to deliver heated water at two different temperatures, comprising a first water storage tank adapted to store water at a first elevated temperature, heating means operably connected to said first water storage tank for heating the water therein to said first temperature, a second water storage tank adapted to store water at a second elevated temperature substantially lower than said first temperature, first discharge conduit means communicating with said first tank for conducting heated water at said first temperature to a location of use, second discharge conduit means communicating with said second tank for conducting heated water at said second temperature to a location of use, high temperature conduit means communicating between said first tank and said second tank for conducting heated water at said first temperature from said first tank to said second tank, return conduit means communicating between said second tank and said first tank, said first tank, second tank, high temperature conduit means and return conduit means providing a closed system for the circulation of water, cold water inlet means for introducing cold water into said closed system, pumping means disposed in said closed system for circulating water therein, first thermostatic means responsive to the temperature of the water in said first tank and operably connected to said heating means for actuating said heating means when the temperature of the water in said first tank falls below said first temperature, and second thermostatic means responsive to the temperature of the water in said second tank and operably connected to said pumping means for actuating said pumping means to circulate water in said closed system when the temperature of the water in said second tank falls below said second temperature.

2. A water heating system adapted to deliver heated water at two different temperatures, comprising a first water storage tank adapted to store water at a first elevated temperature, heating means operably connected to said first water storage tank for heating the water therein to said first temperature, a second water storage tank adapted to store water at a second elevated temperature substantially lower than said first temperature, first discharge conduit means communicating with the upper portion of said first tank for conducting heated water at said first temperature to a location of use, second discharge conduit means communicating with the upper portion of said second tank for conducting heated water at said second temperature to a location of use, high temperature conduit means communicating between the upper portion of said first tank and said second tank for conducting heated water at said first temperature from said first tank to said second tank, return conduit means communicating between said second tank and the lower portion of said first tank, said first tank, second tank, high temperature conduit means and return conduit means providing a closed system for the circulation of water, cold water inlet means for introducing cold water into said closed system, pumping means disposed in said closed system for circulating water therein, first thermostatic means responsive to the temperature of the water in said first tank and operably connected to said heating means for actuating said heating means when the temperature of the water in said first tank falls below said first temperature, and second thermostatic means responsive to the temperature of the water in said second tank and operably connected to said pumping means for actuating said pumping means to circulate water in said closed system when the temperature of the water in said second tank falls below said second temperature.

3. The structure of claim 2 in which the heating means includes a gas burner, a gas supply conduit connected between a source of gas and the burner, and valve means connected in said gas supply conduit, said first thermostatic means being operably connected to said valve means to open said valve means and admit gas to said burner when the temperature of the water in said first tank falls below said first temperature.

4. A water heating system adapted to deliver heated water water at two different temperatures, comprising a first water storage tank adapted to store water at a first elevated temperature, heating means operably connected to said first water storage tank for heating the water therein to said first temperature, a second water storage tank adapted to store water at a second elevated temperature substantially lower than said first temperature, first discharge conduit means communicating with the upper portion of said first tank for conducting heated water at said first temperature to a location of use, second discharge conduit means communicating with the upper portion of said second tank for conducting heated water at said second temperature to a location of use, high temperature conduit means communicating between the upper portion of said first tank and the lower portion of said second tank for conducting heated water at said first temperature from said first tank to said second tank, return conduit means communicating between the lower portion of said second tank and the lower portion of said first tank, said first tank, second tank, high temperature conduit means and return conduit means providing a closed system for the circulation of water, cold water inlet means for introducing cold water into said return conduit means, pumping means disposed in said closed system for circulating water therein, first thermostatic means responsive to the temperature of the water in said first tank and operably connected to said heating means for actuating said heating means when the temperature of the water in said first tank falls below said first temperature, and second thermostatic means responsive to the temperature of the water in said second tank and operably connected to said pumping means for actuating said pumping means to circulate water in said closed system when the temperature of the water in said second tank falls below said second temperature.

5. The structure of claim 4, in which the pumping means is disposed in said return conduit means between said second tank and cold water inlet means and operates to circulate water through said return conduit means to said first tank and then through said high temperature conduit means to said second tank.

6. A water heating system adapted to deliver heated water at two different temperatures, comprising a first water storage tank adapted to store water at a first elevated temperature, heating means operably connected to said first water storage tank for heating the water therein to said sanitizing temperature, a second water storage tank adapted to store water at a second elevated temperature, a first discharge conduit communicating with the upper portion of said first tank and disposed to conduct heated water at said sanitizing temperature to a location of use, a second discharge conduit communicating with the upper portion of said second tank and disposed to conduct heated water at said second temperature to a location of use, a high temperature conduit communicating between the upper portion of said first tank and the lower portion of said second tank and disposed to conduct heated water at said sanitizing temperature from said first tank to said second tank, a return conduit communicating between the lower portion of said second tank and the lower portion of said first tank, said first tank, second tank, high temperature conduit and return conduit providing a closed system for the circulation of water, a cold water inlet conduit connected to said return conduit and disposed to introduce cold water into said system, pumping means disposed in said closed system for circulating water therein, a first thermostat disposed at the lower portion of said first tank and responsive to the temperature of the water in said first tank and operably connected to said heating means for actuating said heating means when the temperature of the water in said first tank falls below said sanitizing temperature, and a second thermostat disposed at the lower portion of said second tank and responsive to the temperature of the water in said second tank and operably connected to said pumping means for actuating said pumping means to circulate water in said closed system when the temperature of the water in said second tank falls below said second temperature.

7. A water heating system adapted to deliver heated water at two different temperatures, comprising a hot water storage heater having a heating member to heat water therein and having a substantial storage capacity to store heated water at a sanitizing temperature of about 180° F., a water storage tank adapted to store water at a second elevated temperature of about 140° F., a first discharge conduit communicating with the upper portion of said water heater for conducting heated water at said sanitizing temperature to a location of use, a second discharge conduit communicating with the upper portion of said second tank for conducting heated water at said second temperature to a location of use, a hot water conduit communicating between the upper portion of said water heater and the lower portion of said tank for conducting heated water at said sanitizing temperature from said water heater to said second tank, return conduit means communicating between the lower portion of said second tank and the lower portion of said water heater, said water heater, tank, high temperature conduit and return conduit providing a closed system for the circulation of water, cold water inlet means for introducing cold water into said closed system, pumping means disposed in said closed system for circulating water therein, first thermostatic means responsive to the temperature of the water in said water heater and operably connected to said heating means for actuating said heating means when the temperature of the water in said water heater falls below said sanitizing temperature, and second thermostatic means responsive to the temperature of the water in said second tank and operably connected to said pumping means for actuating said pumping means to circulate water from said heater through said high temperature conduit to said tank when the temperature of the water in said second tank falls below said second temperature.

References Cited in the file of this patent
UNITED STATES PATENTS

| | | |
|---|---|---|
| 289,847 | McGinley | Dec. 11, 1883 |
| 1,545,938 | Bren | July 14, 1925 |
| 1,731,368 | Baker | Oct. 15, 1929 |
| 2,833,273 | Miller | May 6, 1958 |
| 2,852,018 | Williams | Sept. 16, 1958 |